(12) United States Patent
Deneus et al.

(10) Patent No.: US 7,955,635 B2
(45) Date of Patent: Jun. 7, 2011

(54) PROCESS FOR REDUCING THE LIME CONSUMPTION IN SUGAR BEET JUICE PURIFICATION

(75) Inventors: Eric Deneus, Heverlee (BE); Gunter Merkel, Worms (DE); Thomas Michelberger, Grünstadt (DE); Mohsen Ajdari Rad, Obrigheim (DE); Marc Willems, Tienen-Vissenaken (BE)

(73) Assignee: Sudzucker Aktiengesellschaft, Mannheim/Ochsenfurt (DE)

( * ) Notice: Subject to any disclaimer, the term of this patent is extended or adjusted under 35 U.S.C. 154(b) by 1062 days.

(21) Appl. No.: 10/577,582

(22) PCT Filed: Oct. 26, 2004

(86) PCT No.: PCT/EP2004/012046
§ 371 (c)(1),
(2), (4) Date: May 10, 2007

(87) PCT Pub. No.: WO2005/042787
PCT Pub. Date: May 12, 2005

(65) Prior Publication Data
US 2008/0017187 A1    Jan. 24, 2008

(30) Foreign Application Priority Data
Oct. 30, 2003 (DE) .................................. 103 50 672

(51) Int. Cl.
*A23K 1/00* (2006.01)
(52) U.S. Cl. ............ 426/635; 426/665; 127/40; 127/41; 127/42; 127/43; 127/44; 127/34
(58) Field of Classification Search .................. 426/635, 426/655
See application file for complete search history.

(56) References Cited

U.S. PATENT DOCUMENTS

| | | | | |
|---|---|---|---|---|
| 1,372,891 A * | 3/1921 | Mengelbier | ................ | 127/43 |
| 2,243,381 A * | 5/1941 | Klopfer | ................ | 426/648 |
| 2,281,025 A * | 4/1942 | Cottrell et al. | ................ | 127/47 |
| 2,413,844 A * | 1/1947 | Rawlings | ................ | 127/46.2 |
| 2,754,233 A * | 7/1956 | Owens | ................ | 127/43 |
| 3,806,364 A | 4/1974 | Gasco | ................ | 127/48 |
| 4,009,706 A | 3/1977 | Shaughnessey | ................ | 127/48 |
| 4,111,714 A * | 9/1978 | Hippchen et al. | ................ | 127/46.2 |
| 4,288,551 A | 9/1981 | Gudnason et al. | ................ | 435/168 |

(Continued)

FOREIGN PATENT DOCUMENTS
DE    3238783 A *    7/1983
(Continued)

OTHER PUBLICATIONS

Gray of Fungal protein for food and feeds. IV. Whole sugar beets or beet pulp as a substrate; Economic Botany; vol. 20, No. 4, 1966.*

(Continued)

*Primary Examiner* — Keith D Hendricks
*Assistant Examiner* — Patricia A George
(74) *Attorney, Agent, or Firm* — Ostrolenk Faber LLP

(57) ABSTRACT

The present invention relates to an improved process for extract purification of sugar beet raw juice, especially for reduction of lime consumption during the purification of sugar beet raw juice, to a process for producing a nutrient-rich non-sucrose concentrate from sugar beet raw juice, to the non-sucrose substance concentrate thus produced, to uses of the non-sucrose substance concentrate and to an apparatus for preliming sugar beet raw juice and/or for obtaining the non-sucrose substance concentrate.

42 Claims, 2 Drawing Sheets

U.S. PATENT DOCUMENTS

Figure 1:
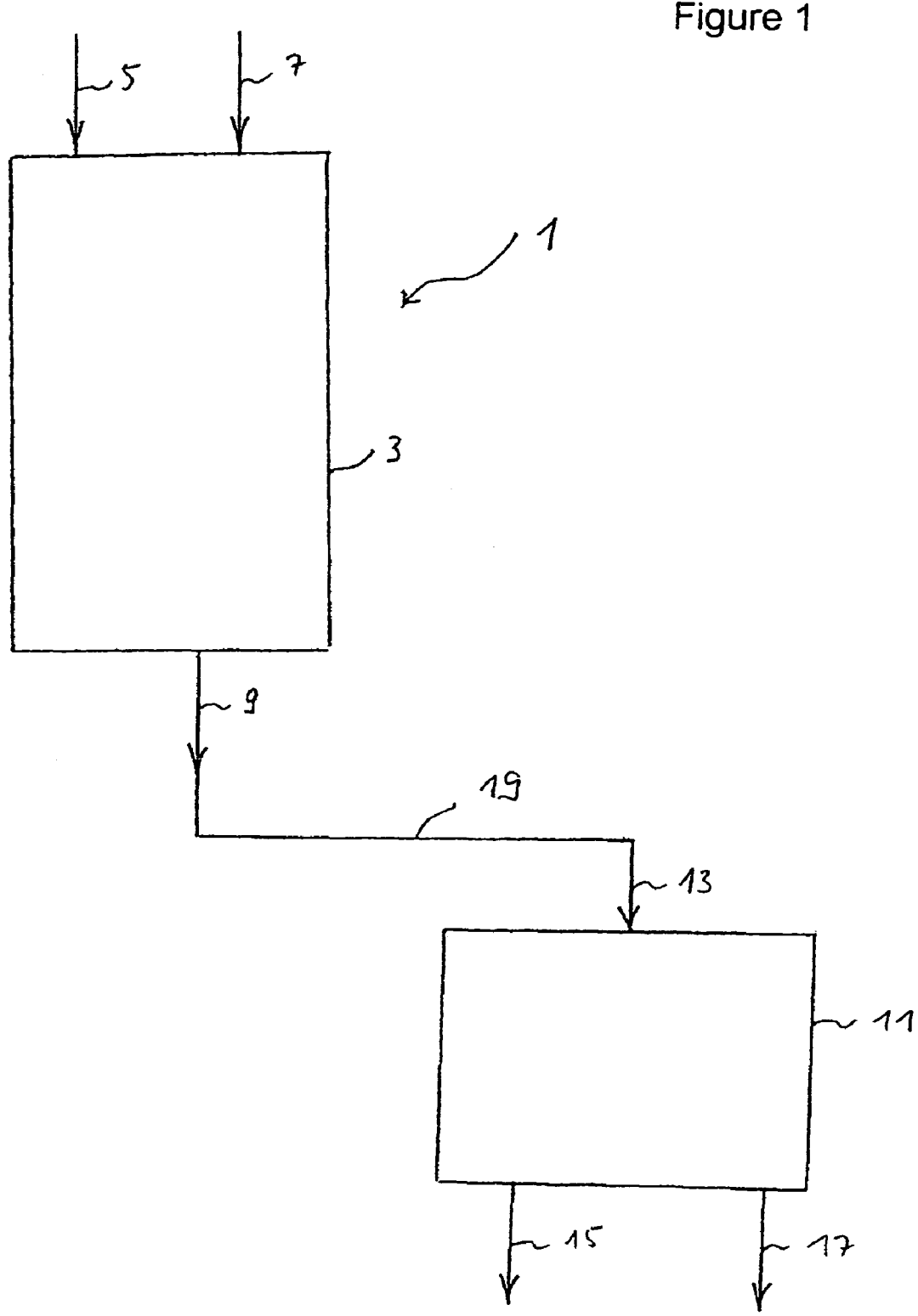

| | | | | |
|---|---|---|---|---|
| 4,795,494 | A | * | 1/1989 | Toth et al. ............... 127/48 |
| 5,653,970 | A | * | 8/1997 | Vermeer ............... 424/70.24 |
| 5,759,283 | A | * | 6/1998 | Ekern et al. ............... 127/42 |
| 5,891,254 | A | * | 4/1999 | Coville et al. ............... 127/48 |

FOREIGN PATENT DOCUMENTS

| | | | |
|---|---|---|---|
| DE | 19628183 A1 | * | 1/1998 |
| EP | 1022343 A1 | * | 7/2000 |
| GB | 2136446 | | 9/1984 |
| RU | 2 68 885 C1 | | 11/1996 |
| RU | 2 105 817 C1 | | 2/1998 |
| RU | 2105817 | | 2/1998 |
| RU | 2105817 C1 | * | 2/1998 |
| RU | 2 137 840 C1 | | 9/1999 |
| RU | 2 172 348 C1 | | 8/2001 |
| SU | 1351997 A1 | | 11/1987 |
| WO | WO 99/24623 | | 5/1999 |

OTHER PUBLICATIONS

Southern Minnesota Sugar Cooperative: Booklet of 1999; http://web.archive.org/web/19990219124606/http://www.sbreb.org/brochures/SugarCoop/.*

Rorabaugh: Beet Juice Defecation; Industrial & Engineering Chemistry, vol. 43, No. 3; Mar. 1951.*

Office Action in related Russian Application No. 2006118706/13(020334), 3 pages, date stamped Sep. 23, 2008 (English language translation only).

Office Action in related Russian Application No. 2006118706/13(020334), date stamped Sep. 3, 2008 (with English language translation), 10 pages total.

Sugar Technology, published by Association of German Sugar Industry, translated from German by P.B. Shapiro and A.B. Fremel, edited by Professor P.M. Silin, Pitschepromizdat Publishers, Moscow, 1958, pp. 180-185, with English language translation, 15 pages.

J. Dobszicki, Purification of Juices in Sugar Production, "Pitschevaya Promyshlennost" Publishers, Moscow, 1964, pp. 20-21, with English language translation, 5 pages.

A.B. Fremel, Use of Wastes of the Beet-Sugar Production, M., TsINTI Pitscheprom, Moscow, 1963, pp. 55-61, with English language translation, 11 pages.

A.R. Sapronov, Technology of Sugar Production, M., Kolos Publishers, 1999, pp. 133-135, pp. 138-141, with English language translation, 17 pages.

International Search Report PCT/EP2004/012046 dated Feb. 16, 2005.

English Translation of International Preliminary Examination Report for PCT/EP2004/012046.

* cited by examiner

PROCESS FOR REDUCING THE LIME CONSUMPTION IN SUGAR BEET JUICE PURIFICATION

CROSS REFERENCE TO RELATED APPLICATIONS

The present application is a 35 U.S.C. §371 National Phase conversion of PCT/EP2004/012046 filed Oct. 26, 2004, which claims priority of German Application No. 103 50 672.1 filed Oct. 30, 2003. The PCT International Application was published in the German language.

FIELD OF THE INVENTION

The present invention relates to an improved process for extract purification of sugar beet raw juice, especially to a process for reducing the lime consumption during the extract purification of sugar beet raw juice, to a process for producing a nutrient-rich non-sucrose concentrate from sugar beet raw juice, to the non-sucrose substance concentrate thus produced, to uses of the non-sucrose substance concentrate and to an apparatus for preliming sugar beet raw juice and/or for obtaining the non-sucrose substance concentrate.

BACKGROUND OF THE INVENTION

Conventionally, sugar is obtained from beets by first cleaning the harvested beets, which frees them of a majority of the earth still adhering and of leaf residues. After passing through a washing step, the beets are sliced to pencil-thick chips by cutting machines. The sugar is obtained from the chips by countercurrent extraction using hot, slightly acidified water having a pH of about 5.5 to 5.8. The acidification of the extraction liquid promotes the filtration of the sugar beet raw juice and the ability of the extracted chips to be pressed out. The sugar beet raw juice obtained in the extraction is subsequently sent to an extract purification. Typically, the extract is purified with the aid of so-called lime-carbonic acid extract purification in the form of a preliming step and main liming step, and of a first and second carbonatation step and of the removal of the precipitate after the first and second carbonatation. The extract purification has the task of very substantially removing the non-sucrose substances present in the sugar beet raw juice, especially high molecular weight substances. The non-sucrose substances to be removed should as far as possible not be degraded, so that no additional low molecular weight substances get into the extract or sugar beet raw juice.

In the preliming step, the sugar beet raw juice is alkalized by adding milk of lime stepwise under gentle conditions. This raises the pH of the sugar beet raw juice in the preliming reactor stepwise to about 11.5. The preliming is effected with addition of defined amounts of calcium hydroxide (milk of lime), the alkalinity of the juice at the end of the preliming step being about 0.1 to 0.3 g of CaO/100 ml of sugar beet raw juice. Owing to the alkalization of the sugar beet raw juice, there is neutralization of the organic and inorganic acids present in the extract, and there are also precipitation reactions of the anions which form insoluble or sparingly soluble salts with calcium. For example, phosphate, oxalate, citrate and sulfate are very substantially separated out. In addition, colloidally dissolved non-sucrose substances coagulate and are precipitated out. The precipitation of individual ingredients, for example of anions such as oxalate, phosphate, citrate, sulfate or of colloids such as pectin and protein substances proceeds within certain pH ranges. Within these pH regions, compaction of the precipitate takes place simultaneously. As a result of the addition of milk of lime during the preliming, there is also coagulation of proteins.

The object of the main liming performed subsequently consists especially in the chemical degradation of invert sugar and amides, which would otherwise proceed in the region of the juice thickening with formation of acid. In the main liming step, the temperature is raised to about 85° C. and the alkalinity of the sugar beet raw juice is increased significantly by the addition of milk of lime, specifically to about 0.8 to 1.1 g of CaO/100 ml of juice. The processes desired in the main liming proceed in the classical process only under such drastic conditions. The lime added in excess in the main liming also plays a large part in the first and second carbonatation. Conversion to calcium carbonate provides a strong adsorbent for a series of soluble non-sucrose substances and also a suitable filter assistant. The lime unconsumed in the main liming process is converted to calcium carbonate by introduction of carbon dioxide as a carbonatation gas in the two carbonatation steps. The carbonatation is effected in two stages. In the first stage of the carbonatation, gas is introduced up to a pH of about 11.2 to 10.6, which corresponds to an alkalinity of 0.10 to 0.06 g of CaO/100 ml of filtrate of the first carbonatation. In the first carbonatation, the non-sucrose substances which have precipitated out and flocculated out, and a portion of the dyes present in the sugar beet raw juice are bound adsorptively to the calcium carbonate formed. The so-called first carbonated juice obtained in the first carbonatation is filtered through thickening filters (candle filters) or decanters passed, and thickened to carbonated juice concentrate. This removes the non-sucrose substances which have precipitated out and flocculated out and are bound to calcium carbonate from the juice. Typically, the first carbonatation is followed by a postliming step, in which the juice is admixed with a little milk of lime and then carbonatated further in the second carbonatation step. In the second carbonatation stage too, carbonatation gas is supplied, the alkalinity to be established, known as the optimal alkalinity, being 0.025 to 0.010 g of CaO/100 ml of filtrate of the second carbonatation. The alkalinity corresponds to a pH of about 9.0 to 9.30. In the second carbonatation, the so-called second carbonated juice forms, which is likewise filtered through thickening filters and thickened. The calcium carbonate sludges (carbonated sludge concentrates) concentrated by means of the thickening filters in the first and second carbonatation are typically combined and pressed out by means of membrane filter presses. This forms the so-called carbolime. This carbolime is a storable product having a dry substance content of more than 70% and is used as a fertilizer. Typically, a portion of the carbonated juice concentrate is returned to the preliming.

The sugar beet raw juice purified in the extract purification, which is also referred to as thin juice and contains about 15 to 17% sugar, is then thickened to a thick juice with about 65 to 70% sugar and then concentrated in crystallizers until a viscous mass, known as the massecuite, with about 85% sugar. Centrifugation of this mass then finally affords white sugar.

A considerable disadvantage of the conventional lime-carbonic acid extract purification is in particular that only a relatively small purification effect is achieved, since only a maximum of 40% of all non-sucrose substances are removed from the sugar beet raw juice. A further disadvantage is that the process requires very large amounts of lime, and the amount of lime consumed can make up about 2.5% of the total weight of the processed sugar beets. The production of the lime used in the lime-carbonic acid extract purification process and the disposal of the waste formed in the quicklime production are, however, relatively expensive. The $CO_2$ emissions from limekiln and juice purification plant are also very high. Furthermore, the carbolime which is obtained in the lime-carbon dioxide extract purification process and consists of lime and removed juice impurities can be used only as fertilizer.

The technical problem on which the present invention is based is therefore to provide an improved process for extract purification of sugar beet raw juice, in which especially the lime consumption for the extract purification is reduced.

SUMMARY OF THE INVENTION

The present invention solves the technical problem underlying it especially by providing a process for extract purification of sugar beet raw juice, comprising the following process steps to be performed sequentially:

a) preliming of the raw juice by adding milk of lime until a concentration of about 0.1 to 0.3 g of CaO/100 ml of raw juice has been attained for precipitation or/and coagulation of non-sucrose substances in the form of a coagulate, b) addition of at least one copolymer of acrylamide and sodium acrylate having a molar mass of about 5 million to about 22 million as a polyanionic flocculant up to a concentration of 1 to 8 ppm, c) removal of the coagulate from the preliming juice using at least one first removal apparatus to obtain a clear preliming juice, d) main liming of the preliming juice obtained after removal of the coagulate by adding milk of lime until a concentration of about 0.6 g of CaO/100 ml in the clear pre-liming juice has been attained, and e) performance of a first carbonatation by introducing carbon dioxide into the main liming juice and optional subsequent performance of a second carbonatation.

In a particular embodiment of the invention, steps a) and b) can also be carried out simultaneously.

The process according to the invention thus envisages that the preliming in itself is performed in a substantially identical manner to the preliming processes customary to date. In contrast to the customary processes, the non-sucrose substances precipitated or coagulated during the preliming, however, are removed actually after the preliming and not, as is customary, only after the first and second carbonatation. According to the invention, apart from milk of lime and the polyanionic flocculant mentioned, which is not a coagulation agent but rather a flocculation agent, no further flocculating or coagulating agent is used.

Since the sugar beet raw juice is already distinctly pure after the preliming as a result of the removal of the non-sucrose substances which have been precipitated out and flocculated out, numerous advantages for the further processing of the sugar beet raw juice arise. In particular, considerably less milk of lime has to be added in the main liming to the preliming juice clarified in accordance with the invention than in the case of conventional lime-carbonic acid extract purification processes. While the alkalinity of the juice in the main liming has to be increased to about 0.8 to 1.1 g of CaO/100 ml of juice in conventional processes, the process according to the invention requires merely an increase in the alkalinity to about 0.6 g of CaO/100 ml of juice. Furthermore, in contrast to conventional processes, the preliming as per the application can be performed without the customary recycling of carbonated juice concentrate from the carbonatation stage into the preliming. Also, it is no longer required, in contrast to conventional processes, that the sugar beet raw juice has to be postlimed after the first carbonatation stage.

The inventive extract purification process is thus notable in an advantageous manner for a significantly reduced lime consumption. The process according to the invention thus leads to a significant reduction in costs of the sugar beet raw juice purification, not least also because the plants required for the production of quicklime can be reduced in size considerably.

The inventive procedure is made possible particularly by the use of selected flocculants which, under the given process conditions, enable particularly efficient extract purification of sugar beet raw juice without addition of further assistants such as coagulating agents. This is because it has been found in accordance with the invention, surprisingly, that when quite specific polyanionic flocculants are used, specifically anionic copolymers of acrylamide and sodium acrylate having a molar mass of about 5 million to about 22 million, in particular AN 945, 2440 and 2540, in an amount of 1 to 8 ppm, the aforementioned efficient purification is ensured. In the above teaching, unless stated otherwise, ppm is understood to mean ppm wt./wt. (w/w) (based on weight).

Owing to the substantially lower contamination with precipitated calcium carbonate, the filterability of the carbonated juices obtained using the process as per the application, especially of the first carbonated juice, is improved to a considerable degree. In-house experiments on the pilot plant scale have shown that the coefficient of filtration of the carbonated juices obtained in accordance with the invention is significantly below $0.5\ s/cm^2$, while the coefficients of filtration of the carbonated juices obtained using conventional extract purification processes are 1 to 3 $s/cm^2$. The filtration properties, improved in accordance with the invention, of the carbonated juices and the inventive reduction in the amount of calcium carbonate formed also has the result that the capacities, required in the carbonatation stages, of thickening filters and membrane filter presses can likewise be reduced considerably in accordance with the invention.

The process according to the invention for purifying sugar beet raw juice is additionally advantageously also suitable for processing beet material of poor quality, especially of deteriorated beets. A further considerable advantage of the process according to the invention is also that the removal of the non-sucrose substances which have precipitated out and flocculated out in the preliming forms a new product in sugar production, which features a high content of phosphate and which can therefore be used especially as an animal feed constituent, but also as a fertilizer. According to the invention, the quality of the carbolime obtained in the pressing-out of the carbonated juice concentrate also improves, especially with regard to its use as a fertilizer. Compared to the carbolime which is obtained using conventional lime-carbonic acid extract purification processes, the carbolime obtained in accordance with the invention features a substantially higher content of calcium carbonate and a considerably reduced content of colloids. The carbolime obtained using the process obtained in accordance with the invention is in particular low in phosphate. In some European regions, problems exist with the overfertilization of farm land, especially with phosphate. The carbolime obtained in accordance with the invention can therefore be used as a soil improver especially in such soils.

The process according to the invention also leads not least to a distinct reduction of $CO_2$ emissions from limekiln and extract purification plant. In view of ever-increasing severity of environmental legislation with introduction of a carbon dioxide tax, this is extremely advantageous.

DETAILED DESCRIPTION OF PREFERRED EMBODIMENTS

"Preliming" is understood to mean the addition of milk of lime to sugar beet raw juice or sugar beet extract up to about 0.1 to 0.3 g of CaO/100 ml of sugar beet raw juice. In the preliming, the sugar beet raw juice is alkalized under gentle conditions, the pH of the sugar beet raw juice being raised from about 6 to about 11.5. The preliming serves to flocculate out non-sucrose substances such as pectin and proteins, and for precipitation of sparingly soluble calcium salts.

In connection with the present invention, "sugar beet raw juice" or "sugar beet extract" is understood to mean the juice which is extracted from chips by countercurrent extraction at about 65 to 75° C. in the so-called diffusion process. In addition to sugar, this sugar-rich sugar beet raw juice also comprises various organic and inorganic constituents of the beets, which are referred to as non-sucrose substances or non-sugar substances.

In connection with the present invention, the "non-sucrose substances" or "non-sugar substances" present in the sugar beet raw juice are understood to mean high molecular weight substances such as protein substances, polysaccharides and cell wall constituents, and also low molecular weight organic compounds such as inorganic or organic acids, amino acids and mineral substances. The cell wall constituents are in particular pectins, lignin, cellulose and hemicellulose. Just like the proteins, which include nucleoproteids in particular, these substances are present as hydrophilic macromolecules in colloidally disperse form. The organic acids are, for example, lactates, citrates and oxalates. The inorganic acids are in particular sulfates and phosphates.

According to the invention, "milk of lime" refers in particular to calcium hydroxide which is formed in the highly exothermic reaction of quicklime (calcium oxide) with water and is used as the liming agent in the preliming and main liming. The addition of milk of lime to the sugar beet raw juice in the preliming brings about the precipitation or coagulation of non-sucrose substances in the form of a coagulate.

According to the invention, a "coagulate" is understood to mean the agglomerates, formed owing to a flocculation process, of the non-sucrose substances present in the sugar beet raw juice, which is also referred to as a protein-containing fraction from the preliming. The coagulate comprises in particular the insoluble or sparingly soluble salts which form as a result of reaction of the anions of organic or inorganic acids with calcium, and the precipitated high molecular weight sugar beet raw juice constituents, especially having hydrophilic character, such as protein substances, polysaccharides and cell wall constituents, which are normally distributed in a colloidally disperse manner in the sugar beet raw juice. The flocculation process is divided into a flocculation in which the aggregation is effected by adsorption of bridge-forming polymers, and a coagulation in which the aggregation is effected by degradation or reduction of repulsive forces. The flocculation rate is dependent upon the temperature, the pH and the way in which the milk of lime is added. The supply of mechanical energy, for example in the course of stirring and shaking, thermal energy, for example by temperature increase, electrical energy, etc. can accelerate the flocculation or coagulation. The precipitation of individual juice ingredients, for example anions such as oxalate, phosphate, citrate and sulfate, and also colloids such as pectin and protein, is effected in certain pH ranges, a compaction of the precipitate taking place within these pH ranges. The pH at which a maximum amount of colloids is flocculated out and the precipitation of insoluble lime salts is virtually complete is referred to as the optimal flocculation point of the preliming. When the precipitation is effected at the optimal flocculation point, there is uniform stable flocculation out of colloidally disperse high molecular weight juice constituents.

The precipitation and coagulation of pectins and proteins requires a particular temperature-dependent residence time. The invention envisages that the preliming can be carried out either as a cold or as a warm preliming. Preference is given to performing the cold preliming at a preliming temperature of about 38 to 40° C. One advantage of the cold preliming consists in a color-improving effect in the case of thin juice, a lower content of non-sucrose substances, a more effective invert sugar degradation and an overall higher extract purification effect. However, the possibility also exists in accordance with the invention of performing the addition of the milk of lime to the sugar beet raw juice as a warm preliming at a temperature of the sugar beet raw juice of 55° C. to 75° C. A warm preliming has the advantage over the cold preliming in particular that the treated sugar beet raw juice has less microbial contaminations.

Preferably in accordance with the invention, the addition of milk of lime to the preliming of the sugar beet raw juice is effected as a progressive preliming. The progressive preliming by a gradual increase in the alkalinity or in the pH of the sugar beet raw juice is effected preferably by slowly feeding the milk of lime lining agent or by small interrupted individual milk of lime additions, the pH optimum in particular being passed through slowly. The advantages of progressive preliming include an improvement in the filtration properties of the treated juice, a lighter thick juice color and avoidance of overalkalization. In addition, the progressive preliming enables a continuous procedure.

The invention likewise envisages that the progressive alkalization of the sugar beet raw juice during the preliming can be effected in countercurrent by an already alkalized sugar beet raw juice, for example by means of the carbonated juice concentrate from the carbonatation stages. The progressive alkalization in countercurrent means that the returned juice of higher alkalinity is mixed as rapidly as possible with a juice of lower alkalinity, without different alkalinity gradients being able to build up within the mixing zone. Using suitable transport systems in the preliming apparatus, it is ensured within the system that the required recycling amount is conducted with high constancy against the main flow direction.

According to the invention, it is envisaged, after the preliming and before the removal of the coagulate formed, to add to the preliming juice at least one copolymer of acrylamide and sodium acrylate with a molar mass of about 5 million to about 22 million as a polyanionic flocculant up to a concentration of 1 to 8 ppm. In connection with the present invention, a "flocculant" is understood to mean a substance which influences the zeta potential of particles in colloidal suspensions, such that they aggregate to flocs and can be removed from the system, for example after sedimentation. Flocculants therefore have to overcome the electrostatic repulsion of the particles which are usually negatively charged in water. According to the invention, the flocculants may also be flocculating assistants or sedimentation accelerators. In connection with the present invention, "flocculating assistants" or "sedimentation accelerants" are understood to mean compounds which bring about the agglomeration of solid particles to larger units or flocs. As a result of the agglomeration as flocs, the solids can settle out significantly more rapidly owing to their greater mass. At the same time, the pores between the individual particles are enlarged, so that the water which is present in the settled sludge can be removed readily by filtration or centrifugation. The polyanionic flocculants used in accordance with the invention have no coagulating action whatsoever, since they do not influence the dispersion of the particles in the liquid phase, but rather bring about the aggregation of the particles by absorption of bridge-forming polymers.

The copolymers of acrylamide and sodium acrylate used as polyanionic flocculants in accordance with the invention are synthetic organic water-soluble polyelectrolytes having a relatively large molecular weight of about 5 million to about 22 million. These compounds are moderately to highly ionic. Particularly preferred flocculants are the products 2440 and 2540 (from Stockhausen) and AN 945 (from Clarflok).

The invention envisages, after a sufficient residence time, the removal of the coagulate formed during the preliming and optionally with use of a flocculant from the preliming juice using a separation or removal apparatus. According to the invention, a "removal apparatus" or "separation apparatus" is understood to mean in particular an apparatus for solid/liquid separation. The solid/liquid separation is based on mechanical processes which are based on the utilization of gravity, centrifugal force, pressure or vacuum. The solid/liquid separation processes on which the mode of action of a removal apparatus used in accordance with the invention is based include, for example, decantation, filtration, sedimentation, clarification and centrifugation.

In a preferred embodiment of the invention, the first removal apparatus used is a decanter, especially a static or dynamic decanter. A "decanter", especially static or dynamic decanter, is understood to mean a device or an apparatus which serves to mechanically remove sedimented substances from a liquid by the sedimentation principle with the aid of gravity. In particular, the invention envisages that, using the decanter, the non-sucrose substances which have precipitated out or flocculated out after the preliming are removed from the preliming juice such that one part by volume of sludge, based on nineteen parts by volume of preliming juice, settles out at the underflow of the decanter. In the case of recycling of carbonated juice concentrate from the carbonatation stages into the preliming, the invention envisages that, using the decanter, the non-sucrose substances which have precipitated out or flocculated out after the preliming are separated from the preliming juice such that one part by volume of sludge, based on nineteen parts by volume of preliming juice, settles out at the underflow of the decanter.

In particular, the invention envisages, in a preferred embodiment, that 1 to 3 ppm of flocculant are added to the preliming juice when a decanter is used as the first removal apparatus.

In a further preferred embodiment of the invention, the first removal apparatus used is a centrifuge. A centrifuge is understood to mean an apparatus for separating substance mixtures by utilizing the centrifugal force. The separation material present in the interior of the rotating centrifuge is exposed to the centrifugal force. The centrifuge used as the first removal apparatus is preferably a pan centrifuge or a decanter centrifuge. According to the invention, a "pan centrifuge" or a "pan separator" is understood to mean a centrifuge having rotating conical baffle plates, at which the heavier components are guided outward, while the lighter components collect close to the axis, whence they are guided away outward. According to the invention, a "decanting centrifuge" is understood to mean a usually conical and frequently continuous screw discharge centrifuge.

In particular, the invention envisages that 1 to 8 ppm of flocculant are added to the preliming juice, for example when a pan centrifuge or decanter centrifuge is used as the first removal apparatus.

In a further preferred embodiment of the invention, it is envisaged that the coagulate removed from the clear preliming juice using the first removal apparatus is concentrated further and thickened using a second removal apparatus, with use of a second removal apparatus.

Preferably in accordance with the invention, the further thickening and concentration of the coagulate is effected using one or more membrane filter press(es) (vertical cake discharge) or one or more automatic filter presses (horizontal cake discharge) as the second removal apparatus. In connection with the present invention, a "membrane filter press" is understood to mean a filter apparatus which is designed either as a frame filter press or as a chamber filter press. A membrane filter press designed as a frame filter press consists of a multitude of rectangular, vertical, grooved plates connected in parallel, which are covered with membranes or designed as membrane filters, and intermediate frames for accommodating the filtercake. A membrane filter press designed as a chamber filter press consists of a multitude of membrane filter plates whose thick edge protrudes relative to the actual filter surface, so that a chamber for accommodating the filtercake forms between two such plates. In the course of thickening and concentration of the coagulate using a membrane filter press, pressing-out of a further clear preliming juice, in accordance with the invention, affords a filtercake which has a dry substance content of about 60 to 70%.

According to the invention, the coagulate obtained using the first removal apparatus may also be thickened further and concentrated using one or more decanter centrifuges, one or more vacuum rotary filters and/or pan separators as the second removal apparatus to obtain a non-sucrose substance concentrate with a high dry substance content of about 40 to 70%, in particular 60 to 70%, and a further clear preliming juice.

The non-sucrose substance concentrate obtained using the second removal apparatus, or the non-sucrose substance filtercake obtained with a dry substance content of about 40 to 70%, in particular 60 to 70%, is particularly nutrient-rich with an especially high phosphate content. This product constitutes a new type of product in sugar production.

According to the invention, the clear preliming juices obtained by the removal steps using the first and second removal apparatus are combined and then subjected to a main liming. In connection with the present invention, a "main liming" is understood to mean the further addition of milk of lime to the preliming juice to increase the alkalinity of the preliming juice at elevated temperature to obtain a main liming juice. The object of the main liming consists in particular in the chemical degradation of invert sugar and amides. In particular, the invention envisages that the main liming is performed by adding milk of lime up to about 0.6 g of CaO/100 ml to the clear preliming juice which has been obtained after removal of the coagulate. In the main liming, the temperature is raised to about 85° C.

The invention envisages subjecting the main liming juice obtained in the main liming subsequently to a first carbonatation by adding carbon dioxide to obtain a first carbonated juice. In connection with the present invention, a "carbonation" or "carbonatation" is understood to mean the reaction of the lime unconsumed in the main liming with carbon dioxide to form calcium carbonate. As a result of the addition of carbon dioxide, the calcium hydroxide dissolved in the main liming juice is converted to calcium carbonate, the pH in the carbonatation reaction being lowered stepwise to about 10.6 to 11.4. In the first carbonatation, the non-sucrose substances and dyes still present in the main liming juice are bound adsorptively to the calcium carbonate.

According to the invention, the first carbonated juice formed after the first carbonatation in the carbonatation reactor is filtered using candle filters to obtain a first carbonated juice concentrate and a first clear carbonatation juice. According to the invention, a "candle filter" is understood to mean a filter apparatus in upright design with suspended filter inserts.

As filter inserts, the candle filter may contain either ceramic and plastic filter inserts or elements with fabric of polymer or metal, and also slotted tubes or wound candles.

The invention also envisages that a portion of the first carbonated juice concentrate can be used for the preliming of the sugar beet raw juice.

According to the invention, the clear carbonatation juice obtained in the first carbonatation is subjected to a second carbonatation by adding carbon dioxide to obtain a second carbonated juice. The introduction of carbon dioxide in the second carbonatation lowers the pH of the treated sugar beet raw juice to about 9.2. The resulting second carbonated juice is likewise filtered through a thickening filter, for example a candle filter.

The invention envisages that the first and/or the second carbonated juice concentrate is combined with a portion of the coagulate obtained from the first or from the second removal apparatus and concentrated further by means of one or more membrane filter presses, or that the first and/or the second carbonated juice concentrate is concentrated further by means of one or more membrane filter presses. According to the invention, the filterability of the first and second carbonated juice is significantly improved owing to the lower loading of the treated sugar beet raw juice with impurities compared to the carbonated juices obtained in conventional lime-carbon dioxide extraction processes. While the first carbonated juice obtained in conventional processes after the first carbonatation has a coefficient of filtration FC of about 1 to 3 $sec/cm^2$, the carbonated juice of the first carbonatation obtained using the inventive extraction process has a coefficient of filtration of less than 0.5 $sec/cm^2$. The second carbonated set obtained in the process according to the invention also has significantly improved filtration properties compared to the second carbonated juices obtained using conventional processes. This leads to an increase in the press capacity as a result of increase of the filtration rate and an increased lifetime of the filter cloths. The carbolime obtained from the first and second carbonated juice concentrates by means of the membrane filter press additionally has several advantages over the carbolime which is obtained using conventional processes. Thus, the carbolime obtained in accordance with the invention consists of almost pure calcium carbonate and contains a substantially smaller amount of non-sucrose substances, in particular a very small amount of phosphate. The carbolime obtained in accordance with the invention can therefore be used in particular as a fertilizer for farmlands which have been overfertilized.

The technical problem on which the present invention is based is likewise solved by a process for reducing the lime consumption in the purification of sugar beet raw juice, the process comprising the following steps in sequential order:
a) preliming of the sugar beet raw juice by adding milk of lime to the sugar beet raw juice until a concentration of about 0.1 to 0.3 g of CaO/100 ml of sugar beet raw juice has been attained for precipitation or/and coagulation of non-sucrose substances in the form of a coagulate,
b) addition of at least one copolymer of acrylamide and sodium acrylate having a molar mass of about 5 million to about 22 million as a polyanionic flocculant up to a concentration of 1 to 8 ppm,
c) removal of the coagulate from the preliming juice using at least one first removal apparatus to obtain a clear preliming juice,
d) main liming of the clear preliming juice obtained after removal of the coagulate by adding milk of lime until a concentration of about 0.6 g of CaO/100 ml in the clear preliming juice has been attained, and
e) performance of a first carbonatation by introducing carbon dioxide into the main liming juice and subsequent performance of a second carbonatation without intermediate postliming.

In a particular embodiment of the invention, steps a) and b) may also be performed simultaneously.

According to the invention, 1 to 8 ppm of flocculant are added, for example in the case of use of pan centrifuge or of a decanter centrifuge as the first removal apparatus. When a static or dynamic decanter is used as the first removal apparatus, preference is given in accordance with the invention to adding 1 to 3 ppm of flocculant. Flocculants particularly preferred in accordance with the invention are the products AN 945, 2440 and 2540.

According to the invention, the coagulate obtained using the first removal apparatus is concentrated using a second removal apparatus to remove a further clear preliming juice. According to the invention, the second removal apparatus comprises one or more decanter centrifuge(s) and/or pan separator(s) or membrane filter press(es).

According to the invention, the clear preliming juices obtained using the first and second removal apparatus are then combined and subjected to a main liming. The main liming juice obtained in the main liming is then, in accordance with the invention, subjected to a first carbonatation by adding carbon dioxide to obtain a first carbonated juice. The first carbonated juice is subsequently filtered by means of a candle filter to obtain a first carbonated juice concentrate and a clear carbonatation juice. According to the invention, the first clear carbonatation juice is subjected to a second carbonatation by introducing carbon dioxide to obtain a second carbonated juice.

The technical problem on which the present invention is based is likewise solved by a process for producing a nutrient-rich, non-sucrose substance concentrate from sugar beet raw juice, the process comprising the following process steps to be performed sequentially:
a) preliming of the sugar beet raw juice by adding milk of lime until a concentration of about 0.1 to 0.3 g of CaO/100 ml of sugar beet raw juice is attained for precipitation and/or coagulation of the non-sucrose substances present in the sugar beet raw juice in the form of a coagulate,
b) addition of at least one copolymer of acrylamide and sodium acrylate having a molar mass of about 5 million to about 22 million as a polyanionic flocculant up to a concentration of 1 to 8 ppm, and
c) removal of the coagulate from the preliming juice using at least one first removal apparatus.

In a particular embodiment, steps a) and b) may also be performed simultaneously.

The non-sucrose substances present in the sugar beet raw juice are in particular high molecular weight protein substances, polysaccharides and cell wall constituents, and also low molecular weight organic or inorganic acids, amino acids and mineral substances. The cell wall constituents are primarily pectin substances, lignin, cellulose and hemi-cellulose. The protein substances present in the sugar beet raw juice are, for example, proteins and nucleoproteids. The invention preferably envisages that, when a static or dynamic decanter is used as the first removal apparatus, the flocculant is added to a content of 1 to 3 ppm. The invention preferably also envisages that, where a centrifuge is used, especially a pan centrifuge or decanter centrifuge, as the first removal apparatus, the flocculant is added to a content of 1 to 8 ppm. Flocculants particularly preferred in accordance with the invention are AN 945, 2440 and 2540.

According to the invention, the coagulate removed using the first removal apparatus is concentrated further and thickened by means of a second removal apparatus, the second removal apparatus used being one or more membrane filter press(es) or one or more decanter centrifuge(s) and/or pan separator(s) or one or more vacuum rotary filters.

The resulting concentrated coagulate, which is present, for example, in the form of a filtercake, preferably has a dry substance content of 60 to 70%. The non-sucrose substance concentrate obtained in accordance with the invention is notable in particular for its high phosphate content. The invention envisages that the concentrated coagulate can be comminuted further and dried.

The present invention therefore also relates to a non-sucrose concentrate, comprising a dewatered coagulate of non-sucrose substances made from sugar beet raw juice, obtainable using a process according to the invention, especially obtainable by preliming the sugar beet raw juice with addition of milk of lime and a flocculant for precipitation or coagulation of non-sucrose substances and removal of the separated or coagulated non-sucrose substances from the sugar beet raw juice. The non-sucrose substance concentrate is notable in that the non-sucrose substances comprise in particular high molecular weight protein substances, polysaccharides and cell wall constituents, and also low molecular weight organic or inorganic acids, amino acids and mineral substances of the sugar beet raw juice. According to the invention, the concentrate has a high phosphorus content.

The present invention likewise relates to the use of the non-sucrose substance concentrate as a fertilizer or soil improver. A further preferred use of the non-sucrose substance concentrate consists in the use as an animal feed. For use as an animal feed, the inventive non-sucrose substance concentrate is preferably comminuted, mixed with molasses and dried, and then used as animal feed.

The present invention solves the technical problem on which it is based also by an apparatus for preliming sugar beet raw juice and/or for obtaining a non-sucrose substance concentrate which consists of a concentrated coagulate of non-sucrose substances made from sugar beet raw juice, comprising at least one vessel for milk of lime treatment of the raw juice for coagulation of the non-sucrose substances present in the sugar beet raw juice, said vessel having at least one inlet for the raw juice, at least one inlet for milk of lime and an outlet for discharge of the prelimed raw juice, and at least one first removal apparatus for removing the coagulate slurry obtained in the preliming from the preliming juice, said removal apparatus having an inlet, connected to the outlet of the vessel, for the preliming juice, a first outlet for discharge of the clear preliming juice removed from the coagulate slurry, and a second outlet for discharge of the coagulate slurry. The first removal apparatus is preferably a static or dynamic decanter or one or more centrifuge(s), in particular one or more pan centrifuge(s) or/and decanter centrifuge(s).

In a preferred embodiment, the second outlet of the first removal apparatus is connected via a feed line to a second removal apparatus, in order to further concentrate and to thicken the coagulate slurry present in the first removal apparatus.

According to the invention, the second removal apparatus has an inlet for the coagulate slurry discharged from the first removal apparatus, a first outlet for the discharge of the clear preliming juice obtained in the coagulate slurry concentration, and a second outlet for discharge of the concentrated coagulate slurry. According to the invention, the second removal apparatus is more preferably one or more membrane filter press(es) or at least one centrifuge, in particular a pan separator or a decanter centrifuge or a vacuum rotary filter.

The vessel or reactor used for preliming of the sugar beet raw juice may, for example, be an upright vessel which is divided by intermediate plates aligned essentially horizontally into chambers one on top of another, which are connected via passage orifices and acted upon by stirrer elements, by means of which the adjustment of the pH profile can be performed in a simple manner. The stirrer elements used may be axial pumps. However, the individual chambers of the reactor may also be connected via external pipelines which pass the juice from the start of one chamber to the end of the next chamber.

However, the preliming reactor or preliming vessel may also be designed as a stirred tank battery whose stages each have at least one chamber or a plurality of chambers flowed through in sequence by juice.

The preliming reactor or preliming vessel used in accordance with the invention preferably allows a progressive alkalization of the sugar beet raw juice in countercurrent to already alkalized juice. The preliming reactor used in accordance with the invention therefore suitably has transport devices which conduct a required recycling amount with maximum constancy counter to the main flow direction.

Figure 2:
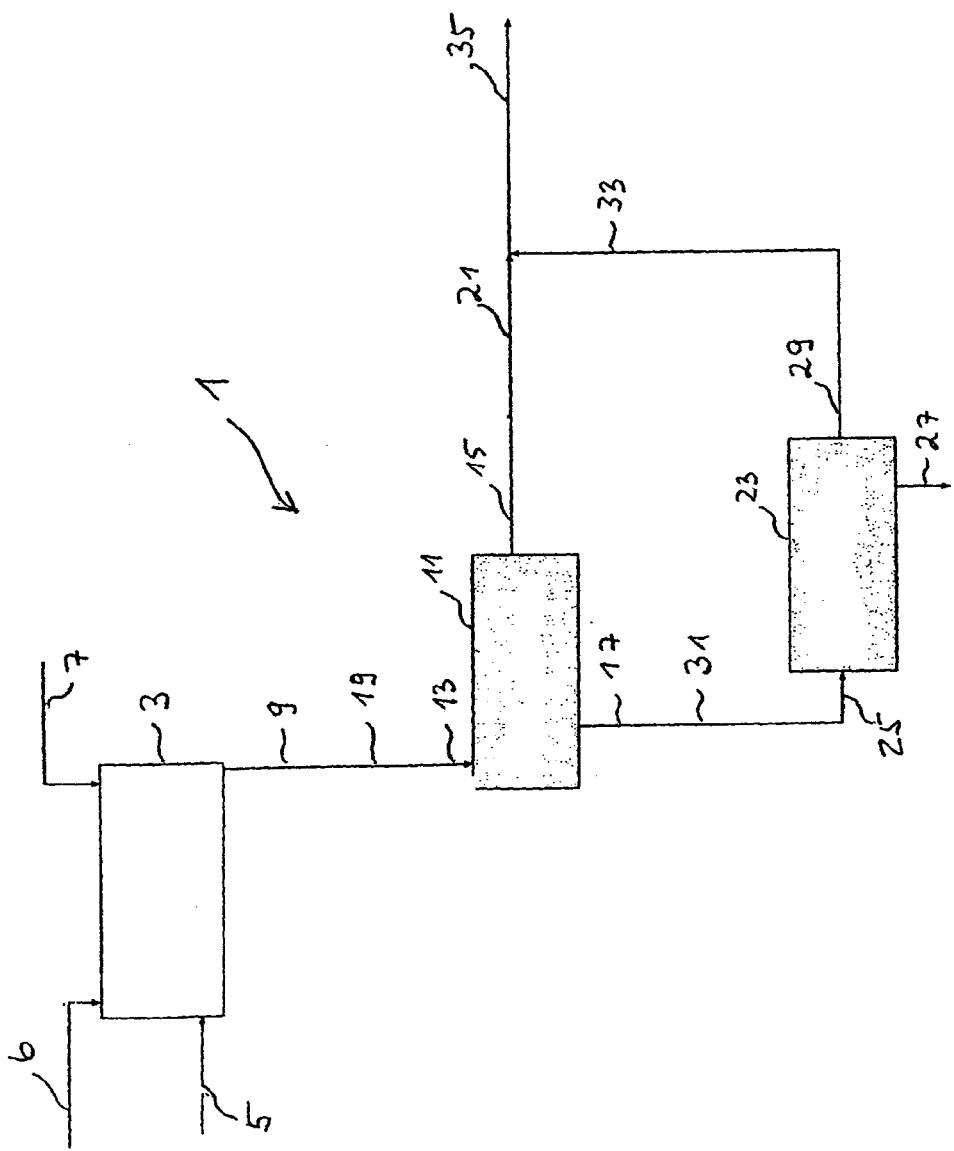

The invention is illustrated in detail by FIGS. 1 and 2 and the example.

FIG. 1 shows, in schematic form, one embodiment of the inventive apparatus for preliming sugar beet raw juice and/or for producing a non-sucrose substance concentrate, comprising a vessel 3 for milk of lime treatment of the sugar beet raw juice and, connected thereto, a first removal apparatus 11 for removing the coagulate obtained in the preliming in the vessel 3 from the preliming juice. The vessel 3 has an inlet 5 for the sugar beet raw juice and an inlet 7 for the milk of lime. The vessel 3 also has an outlet 9 for discharge of the preliming juice. The outlet 9 of the preliming vessel 3 is connected to the inlet 13 of the first removal apparatus 11 via a line 19, so that the preliming juice from the preliming vessel 3 passes into the first removal apparatus 11. In the first removal apparatus 11, the coagulate formed in the preliming juice is removed from the clear preliming juice as coagulate slurry, the coagulate slurry being transported via the outlet 17 of the removal apparatus 11 out of the removal apparatus 11, while the clarified preliming juice is transported via the outlet 15 of the removal apparatus 11 out of the removal apparatus 11.

FIG. 2 shows, in schematic form, a further embodiment of the inventive apparatus for preliming sugar beet raw juice and/or for producing a non-sucrose substance concentrate. The inventive apparatus 1 comprises a vessel 3 for milk of lime treatment of the sugar beet raw juice and, connected thereto, a first removal apparatus 11 for removing the coagulate obtained in the preliming in the vessel 3 from the preliming juice. In addition to the inlet 5 for the raw juice and the inlet 7 for the milk of lime, the vessel 3 also has an inlet 6 for the introduction of carbonated juice concentrate which is obtained from the first and second carbonatation which are not shown. The vessel 3 likewise has an outlet 9 for discharge of the resulting preliming juice. The outlet 9 of the preliming vessel 3 is connected via a line 19 to the inlet 13 of the first removal apparatus 11, so that the preliming juice from the preliming vessel 3 passes into the first removal apparatus 11. In the first removal apparatus 11, the coagulate formed in the preliming juice is removed as coagulate slurry from the clear preliming juice. The clarified preliming juice is transported via the outlet 15 out of the first removal apparatus 11. The removed coagulate slurry is transported via the line 17 out of the first removal apparatus 11. The outlet 17 is connected via the line 31 to the inlet 25 of the second removal apparatus 23, so that the coagulate slurry from the first removal apparatus 11 passes via the outlet 17, the line 31 and the inlet 25 into the second removal apparatus 23. In the second removal apparatus 23, the coagulate slurry introduced is concentrated to obtain a concentrate coagulate slurry and a further clear preliming juice. The concentrated coagulate slurry is transported via the outlet 27 out of the second removal apparatus 23. The clear preliming juice formed in the second removal apparatus 23 is transported via the outlet 29 out of the second removal apparatus 23 and fed via the line 33 connected to it to the line 21 in which the clear preliming juice is transported out of the first removal apparatus 11. In this way, the clear preliming juice from the second removal apparatus 23 is mixed with the clear preliming juice from the first removal apparatus 11. The mixture of the clear preliming juices from the first removal apparatus 11 and the second removal apparatus 23 is then passed together via the line 35 and via heat exchangers which are not shown to the main liming.

EXAMPLE

The following Example is provided only for the purpose of illustrating the invention. It should not be deemed as limiting the invention in any manner.

Juice Purification with the Removal of Preliming Coagulate

Preliming 30 kg of raw juice are introduced into a heated vessel which has a volume of 50 l and has a stirrer, a $CO_2$ introduction tube and a pH electrode, and heated to 55° C. Over a period of 20 min, milk of lime is added stepwise to the raw juice up to the pH of the optimal flocculation point of the preliming (approx. 0.1 to 0.3 g of CaO/100 ml of juice). To increase the settling rate, a polyanionic flocculating assistant (AN 945) is subsequently added. The clear supernatant formed (clear juice) is drawn off in a stock vessel. The carbonated juice concentrate formed is discharged and sent to a membrane filter press or decanter centrifuge.

Main Liming 25 kg of clear juice are introduced into the cleaned, heatable vessel and admixed with milk of lime in an amount of 0.6 g of CaO/100 ml of juice (conventional processes: about 1.0-1.1 g of CaO/100 ml of juice). The juice temperature is then increased to 85° C. This temperature is kept for 20 min.

First carbonatation

Introduction of $CO_2$ lowers the pH to 11.2 over a period of 15 min.

First Filtration

The carbonatized juice is transferred into a 30 l suction filter and filtered. The coefficient of filtration of the resulting carbonated juice is less than 0.5 s/cm², while the coefficient of filtration of the carbonated juice obtained by means of the conventional process is about 2 s/cm².

Second Carbonatation

The filtered juice is transferred into the cleaned, heatable vessel and heated to 95° C. Introduction of $CO_2$ lowers the pH to 9.2.

2nd Filtration

The carbonatized juice is transferred into a 30 l pressure suction filter and filtered. The thin juice is obtained.

What is claimed is:

1. A process for extract purification of sugar beet raw juice, comprising:
    a) preliming sugar beet raw juice by adding milk of lime thereto until a concentration of about 0.1 to 0.3 g of CaO/100 ml of raw juice has been attained for at least one of precipitation and coagulation of non-sucrose substances in the form of a coagulate,
    b) adding at least one copolymer of acrylamide and sodium acrylate having a molar mass of about 5 million to about 22 million as a polyanionic flocculation assistant in a concentration of 1 to 8 ppm, to the prelimed juice,
    c) removing coagulate from the preliming juice using at least one first removal apparatus to obtain a clear preliming juice,
    d) main liming the preliming juice obtained after removal of the coagulate by adding milk of lime until a concentration of about 0.6 g of CaO/100 ml in the clear preliming juice has been attained, and
    e) performing a first carbonatation by introducing carbon dioxide into the main liming juice followed by an optional subsequent performance of a second carbonatation.

2. The process according to claim 1, wherein 1 to 3 ppm of flocculant are added.

3. The process according to claim 1, wherein the first removal apparatus is a static or dynamic decanter.

4. The process according to claim 1, wherein the first removal apparatus used is a centrifuge.

5. The process according to claim 4, wherein the centrifuge is a pan centrifuge or decanter centrifuge.

6. The process according to claim 1, wherein the removed coagulate is concentrated further using a second removal apparatus by removing a further clear preliming juice.

7. The process according to claim 6, wherein the second removal apparatus used is at least one membrane filter press.

8. The process according to claim 6, wherein the second removal apparatus used is one or more of at least one of decanter centrifuge(s), pan separators and vacuum rotary filters.

9. The process according to claim 1, further comprising concentrating the coagulate removed from the preliming step in step (c) to obtain a concentrated coagulate having a dry substance content of 40% to 70%.

10. The process according to claim 6, wherein the clear preliming juices obtained using the first and second removal apparatus are combined and subjected to a main liming.

11. The process according to claim 1, wherein the pH of the main liming juice is lowered stepwise to from 10.6 to 11.4 by adding carbon dioxide.

12. The process according to claim 1, wherein the first carbonated juice is filtered by means of a candle filter to obtain a first carbonated juice concentrate and a first clear carbonatation juice.

13. The process according to claim 12, wherein a portion of the first carbonated juice concentrate is used for preliming the beet raw juice.

14. The process according to claim 12, wherein the first clear carbonatation juice is subjected to a second carbonatation by adding carbon dioxide to obtain a second carbonated juice.

15. The process according to claim 14, wherein the second carbonated juice is concentrated by removing a second clear carbonatation juice by means of a filter separator to obtain a second carbonated juice concentrate.

16. The process according to claim 15, wherein the first and second carbonated juice concentrate are combined and concentrated further by a membrane filter press to obtain a carbolime.

17. A process for reducing lime consumption in extract purification of sugar beet raw juice, comprising:
   a) preliming sugar beet raw juice by adding milk of lime thereto up to about 0.1 to 0.3 g of CaO/100 ml of raw juice for precipitation or coagulation of non-sucrose substances in the form of a coagulate,
   b) adding at least one copolymer of acrylamide and sodium acrylate having a molar mass of about 5 million to about 22 million as a polyanionic flocculant up to a concentration of 1 to 8 ppm, to the prelimed juice,
   c) removing the coagulate from the preliming juice using at least one first removal apparatus to obtain a clear preliming juice,
   d) main liming preliming juice obtained after removal of the coagulate by adding milk of lime up to about 0.6 g of CaO/100 ml to the clear preliming juice, and
   e) performing a first carbonatation by introducing carbon dioxide into the main liming juice and subsequently performing a second carbonatation without intermediate postliming.

18. The process according to claim 17, wherein 1 to 3 ppm of flocculant are added and the first removal apparatus is a static decanter.

19. The process according to claim 17, wherein 1 to 8 ppm of flocculant are added and the first removal apparatus is a pan centrifuge or decanter centrifuge.

20. The process according to claim 17, wherein the coagulate removed is concentrated further using a second removal apparatus by removing a further clear preliming juice.

21. The process according to claim 20, wherein the second removal apparatus comprises one or more of at least one of decanter centrifuge(s), pan separators, vacuum rotary filters and membrane filter press(es).

22. The process according to claim 20, wherein clear preliming juices obtained using the first and second removal apparatus are combined and subjected to a main liming.

23. The process according to claim 17, wherein the first carbonated juice is filtered by a candle filter to obtain a first carbonated juice concentrate and a clear carbonatation juice.

24. The process according to claim 23, wherein the first clear carbonatation juice is subjected to a second carbonatation by adding carbon dioxide thereto to obtain a second carbonated juice.

25. A process for producing a nutrient-rich non-sucrose substance concentrate from sugar beet raw juice, comprising:
   a) preliming sugar beet raw juice by adding milk of lime up to about 0.1 to 0.3 g of CaO/100 ml of raw juice for precipitation or coagulation of non-sucrose substances present in the raw juice in the form of a coagulate,
   b) adding at least one copolymer of acrylamide and sodium acrylate having a molar mass of about 5 million to about 22 million as a polyanionic flocculant in the prelimed raw juice up to a concentration of 1 to 8 ppm, and
   c) removing the coagulate from the preliming juice using at least one first removal apparatus.

26. The process according to claim 25, wherein the non-sucrose substances present in the raw juice are (a) high molecular weight protein substances, (b) polysaccharides and (c) cell wall constituents, and also (d) low molecular weight organic or inorganic acids, (e) amino acids and (f) mineral substances.

27. The process according to claim 26, wherein the cell wall constituents are selected from the group consisting of pectin substances, lignin, cellulose and hemicellulose.

28. The process according to claim 26, wherein the polysaccharides are levan and dextran.

29. The process according to claim 26, wherein the protein substances are selected from the group consisting of proteins, nucleoproteins and betaine.

30. The process according to claim 26, wherein 1 to 3 ppm of flocculant are added.

31. The process according to claim 30, wherein the first removal apparatus is a static or dynamic decanter.

32. The process according to claim 25, wherein the first removal apparatus is a pan centrifuge or a decanter centrifuge.

33. The process according to claim 25, wherein the removed coagulate is concentrated further using a second removal apparatus.

34. The process according to claim 33, wherein the second removal apparatus comprises one or more of at least one of decanter centrifuge(s), pan separator(s), vacuum rotary filters and membrane filter press(es).

35. The process according to claim 33, wherein a concentrated coagulate with a dry substance content of 40% to 70% is obtained.

36. The process according to claim 35, wherein the concentrated coagulate is comminuted and dried.

37. A non-sucrose substance concentrate, comprising a dewatered coagulate of non-sucrose substances made from sugar beet raw juice, obtained using a process according to claim 1 by preliming the raw juice with addition of milk of lime and a flocculant for precipitation or coagulation of non-sucrose substances and removal of the separated or coagulated non-sucrose substances from the raw juice.

38. The non-sucrose substance concentrate according to claim 37, wherein the non-sucrose substances are (a) high molecular weight protein substances, (b) polysaccharides and (c) cell wall constituents, and also (d) low molecular weight organic or inorganic acids, (e) amino acids and (f) mineral substances.

39. The non-sucrose substance concentrate according to claim 37, wherein the concentrate has a high phosphorus content.

40. A method of making a phosphate fertilizer or a soil improver which comprises including therein a non-sucrose substance concentrate according to claim 37.

41. A method of making an animal feed comprising including in said feed a non-sucrose substance concentrate according to claim 37.

42. The method according to claim 41, wherein the non-sucrose substance concentrate is comminuted, mixed with molasses and dried.

* * * * *